United States Patent
Stoller et al.

(10) Patent No.: US 11,465,947 B2
(45) Date of Patent: Oct. 11, 2022

(54) FLOWABLE MIXTURE INCLUDING ELEMENTAL SULFUR AND HYDRATED CLAY AND METHOD FOR PRODUCING THE SAME

(71) Applicant: Stoller Enterprises, Inc., Houston, TX (US)

(72) Inventors: Jerry Stoller, Houston, TX (US); Ritesh Sheth, Friendswood, TX (US)

(73) Assignee: Stoller Enterprises, Inc, Houston, TX (US)

( * ) Notice: Subject to any disclaimer, the term of this patent is extended or adjusted under 35 U.S.C. 154(b) by 0 days.

(21) Appl. No.: 14/997,514

(22) Filed: Jan. 16, 2016

(65) Prior Publication Data
US 2016/0207844 A1    Jul. 21, 2016

Related U.S. Application Data

(60) Provisional application No. 62/104,134, filed on Jan. 16, 2015.

(51) Int. Cl.
| | |
|---|---|
| C05G 5/27 | (2020.01) |
| C05D 9/00 | (2006.01) |
| A01N 25/02 | (2006.01) |
| A01N 59/02 | (2006.01) |
| C05D 5/00 | (2006.01) |
| C05D 9/02 | (2006.01) |

(52) U.S. Cl.
CPC ............ C05D 9/00 (2013.01); A01N 25/02 (2013.01); A01N 59/02 (2013.01); C05D 5/00 (2013.01); C05D 9/02 (2013.01); C05G 5/27 (2020.02)

(58) Field of Classification Search
None
See application file for complete search history.

(56) References Cited

U.S. PATENT DOCUMENTS

| | | |
|---|---|---|
| 1,860,320 A | 5/1929 | Nordlander |
| 1,934,989 A | 11/1933 | McDaniel |
| 2,304,749 A | 11/1941 | Cross |
| 2,683,658 A | 3/1951 | Saunders |
| 2,771,389 A | 7/1951 | Dye |
| 2,664,379 A | 12/1953 | Russo |
| 2,773,797 A | 12/1956 | Orwoll |
| 4,133,669 A | 1/1979 | Caldwell |
| 4,256,691 A | 3/1981 | Ott |
| 4,334,906 A | 6/1982 | Young |
| 4,372,872 A * | 2/1983 | Backlund .................. C05D 9/00 516/96 |
| 4,394,150 A * | 7/1983 | Garrison, Jr. ............ C05D 9/00 106/287.32 |
| 4,487,624 A | 12/1984 | Lalancette |
| 4,569,859 A | 2/1986 | Zaharko |
| 5,599,373 A | 2/1997 | Zanuccoli |
| 6,627,680 B2 | 9/2003 | Zakiewicz |
| 6,749,659 B1 | 6/2004 | Yu |
| 8,017,158 B2 | 9/2011 | Valencia |
| 8,241,387 B2 | 8/2012 | Shah |
| 8,801,827 B2 | 8/2014 | Taylor |
| 8,814,976 B2 | 8/2014 | Pedersen |
| 2004/0050127 A1 | 3/2004 | Ambri |
| 2006/0252649 A1* | 11/2006 | Pluta ..................... A01N 25/08 504/367 |
| 2011/0302973 A1 | 12/2011 | Antens |
| 2012/0036906 A1 | 2/2012 | Pedersen |
| 2013/0345052 A1* | 12/2013 | Shah ....................... C05G 3/02 504/101 |

FOREIGN PATENT DOCUMENTS

| | | |
|---|---|---|
| WO | 2008024007 | 2/2008 |
| WO | 2008089568 A1 | 7/2008 |

OTHER PUBLICATIONS

AMCOL Metalcasting, Sieve Comparison Chart (2013).*
Dombrowski et al., American Chemical Society (1984), pp. 63-73.*
Grundfos (2003), pp. 1-62. (Year: 2003).*

* cited by examiner

Primary Examiner — Jessica Worsham
(74) Attorney, Agent, or Firm — Yancy IP Law, PLLC

(57) ABSTRACT

The present invention is directed to a flowable mixture including: a) a hydrated clay suspension and b) sulfur derived from elemental sulfur. Preferably, the flowable mixture includes elemental sulfur particles and a hydrated, absorbent clay, such as bentonite clay. The flowable mixture is preferably a liquid mixture for use as a fertilizer or fungicide.

20 Claims, No Drawings

FLOWABLE MIXTURE INCLUDING ELEMENTAL SULFUR AND HYDRATED CLAY AND METHOD FOR PRODUCING THE SAME

CROSS-REFERENCE TO RELATED APPLICATIONS

This application claims the benefit, under 35 U.S.C. 119(e), of U.S. Provisional Application No. 62/104,134 filed Jan. 16, 2015, the contents of which are incorporated herein by reference.

BACKGROUND OF THE INVENTION

1. Field of the Invention

The present invention relates generally to a flowable mixture including elemental sulfur and a hydrated clay. Preferably, the present invention relates to a flowable mixture including elemental sulfur particles and a hydrated, absorbent clay, such as bentonite clay, and a method for producing the same for use as a fertilizer or fungicide.

2. Description of Related Art

It is generally known in agricultural sciences that sulfur fertilization increases crop yield and quality and further has a beneficial effect on nitrogen processing by plants. This nitrogen processing is in turn related to protein synthesis, cell replication, photosynthesis, and disease resistance. Generally, simple or complex sulfates are soluble in water and are therefore easily leached by irrigation water and rainwater. To obviate this drawback, fertilizers have been used which are based on elemental sulfur, which is not subject to leaching because it is insoluble in water.

However, more stringent air pollution regulations and the reduction of sulfur dioxide emissions have resulted in a greater incidence of sulfur deficiencies in agricultural soils, thereby increasing the demand for sulfur containing fertilizers.

Generally speaking, powdered elemental sulfur has little utility as an agricultural fertilizer because of difficulty in handling, and the sulfur dust acts as an eye irritant. Sulfur dust also presents an explosive risk in handling facilities and segregates if blended with granular fertilizer products.

In order to avoid this drawback, solid fertilizers have long been known which are constituted by a mixture of elemental sulfur, a chemically inert agent acting as a dispersant, such as clay, bentonite, kaolins, attapulgite or the like, and optionally a wetting agent that facilitates fertilizer contact with the moisture contained in the soil and absorption thereof. These fertilizers are produced by agglomeration as lens-shapes, ovules, cylinders, pellets or grains, with known methods for casting, wet extrusion or moist granulation of the mixture.

In order to provide greater dispersion of the sulfur, some elemental sulfur particulate products mix the sulfur with bentonite clay by means of a hot process utilizing molten sulfur during the production stage. Upon application of the particulate, the clay imbibes water and breaks apart, dispersing the particulate. In actuality the particulates do not readily disperse into finely divided particles and sulfur oxidation to the soluble form proceeds at a very slow rate. This occurs due to molten hydrophobic sulfur coating the clay particles during the production stage preventing contact with water.

Water degradable prills have been formed by pelletizing a mixture of elemental sulfur and bentonite clay to produce a water degradable prill which includes adding dry clay dust to molten sulfur at an elevated temperature to provide a molten sulfur-clay mixture, forming droplets of the mixture, providing a liquid fertilizer coolant at a temperature lower than the solidification temperature of the sulfur-bentonite mixture, feeding the droplets into the coolant, passing the droplets through the coolant for a time sufficient to anneal the droplets into pellets, and removing the annealed pellets from the coolant.

Particles have also been formed by passing a mixture of molten sulfur and a particulate-swelling clay through a plurality of orifices and into an aqueous solution of a water soluble electrolyte salt, maintained at a temperature effective to cool the mixture below its solidification temperature.

Also, a mixture of sulfur and bentonite have been prilled to produce a water-degradable prill by adding dry bentonite in powdered form to molten sulfur at a temperature to provide a molten sulfur-bentonite mixture, forming droplets of the mixture, providing a quenching solution of either sodium chloride, sodium sulfate, potassium chloride or potassium sulfate at a temperature low enough to solidify the sulfur-bentonite mixture.

Furthermore, sulfur-based, chemical soil-correctives or conditioners for agricultural use have been provided in the form of pellets, said product containing fly sulfur powder, at least 3% by weight of an inert compound selected from the group consisting of clay, bentonite, kaolin and mixtures thereof, and at least 0.5% by weight of a wetting agent.

These fertilizers, after being spread into the soil, swell due to the absorption of moisture on the part of the clays (bentonite, kaolins or the like); a process of breakdown and dispersion thus begins which leads to the release of minute particles of elemental sulfur which, as described, are subject to the attack of bacterial microorganisms that convert them into organosulfur compounds that can be assimilated by plants.

BRIEF SUMMARY OF THE INVENTION

The present invention is directed to a flowable mixture including sulfur derived from elemental sulfur and a hydrated clay suspension. Preferably, the present invention relates to a flowable mixture including elemental sulfur particles and a hydrated, absorbent clay, such as bentonite clay, and a method for producing the same for use as a fertilizer or fungicide.

The flowable mixture preferably includes elemental sulfur particles of a small [<10 um] particle size thereby allowing for greater performance in the field as a fertilizer or fungicide. The flowable suspension is more stable than previous compositions as it preferably does not use any bio-based suspending agents, which are prone to biological attack and thereby cause the suspended concentrate to fail. This failure is known to occur with known flowable sulfurs as it cannot be put in large bulk containers as biological entry is prevalent when the container is opened multiple times. In a preferred embodiment, the flowable mixture does not include any other surfactants or preservatives, and only uses "organically" allowed ingredients thereby allowing the flowable mixture to be listed as an organic pesticide, fertilizer or fungicide.

DETAILED DESCRIPTION OF THE INVENTION

A flowable mixture containing a hydrated clay suspension, sulfur derived from elemental sulfur and optional additives is provided. In one embodiment, the flowable mixture includes a hydrated clay suspension and elemental sulfur particles suspended in the hydrated clay suspension. The flowable mixture preferably includes 40-60 wt. % sulfur derived from elemental sulfur, based on the total weight of the flowable mixture, for use as a fertilizer or fungicide.

The flowable mixture is more stable than previous compositions as it preferably does not use any bio-based suspending agents, which are prone to biological attack and thereby cause the suspended concentrate to fail. Such bio-based suspending agents that are preferably excluded from the present flowable mixture include, but are not limited to xanthan, guar and cellulose gums.

In a preferred embodiment, the flowable mixture does not include any surfactants or preservatives. Such surfactants or preservatives that are preferably excluded from the present flowable mixture include, but are not limited to biocides, biostats, and emulsion stabilizing water and oil based surfactants.

In a preferred embodiment, the flowable mixture only uses "organically" allowed ingredients thereby allowing the flowable mixture to be listed as an organic pesticide, fertilizer or fungicide. "Organically" allowed ingredients are those that are allowed by the United States National Organic Program, such as, for example non-synthetic natural substances (205.600) and synthetic substances allowed in organic crop production (205.601).

In one embodiment of the present invention, the hydrated clay suspension is prepared by combining an absorbent clay, preferably bentonite, with a solvent, preferably water. In one such embodiment, water is the only solvent present in the hydrated clay suspension. In another preferred embodiment, the hydrated clay suspension consists of only absorbent clay and water. Preferably, the hydrated clay suspension includes between 0.5-7.5 wt. %, more preferably 0.5-5.0 wt. %, and even more preferably between 0.5-3 wt. % absorbent clay, such as bentonite, based on the total weight of the flowable mixture. The bentonite is preferably calcium and/or sodium bentonite. Preferably, the absorbent clay is hydrated in water until the viscosity of the hydrated clay suspension is higher than water itself, i.e. >1 cP and more preferably >10 cP (20° C.).

In one embodiment, the elemental sulfur is provided as a suspension of elemental sulfur particles and combined with the hydrated clay suspension. Preferably, the suspension of elemental sulfur particles is prepared by thoroughly homogenizing molten elemental sulfur with a solvent. In a preferred embodiment, the only solvent in the suspension of elemental sulfur particles in water. Preferably, the suspension of elemental sulfur is concentrated to include 70-80 wt. % elemental sulfur in an aqueous media based on the weight of the suspension. The flowable mixture preferably includes elemental sulfur particles of a low particle size, thereby allowing for greater performance in the field as a fertilizer or fungicide. In preferred embodiments, the elemental sulfur particles in the suspension has a particle size of less than 50 um, more preferably less than 20 um, more preferably less than 5 um, and even more preferably less than 1.5 microns.

Furthermore, the flowable mixture may include additives such as 0-5 wt. % anti-freeze, such as propylene glycol, and 0-5 wt. % anti-foam, such as polydimethylsiloxane, based on the total weight of the flowable mixture. Optionally, to further incorporate an insecticidal property, diatomaceous earth may be included as an additive between 0-10 wt. %, and more preferably 0-5 wt. % based on the total weight of the flowable mixture. In a preferred embodiment, the flowable mixture does not include any preservatives and/or surfactants.

In a preferred embodiment, the flowable mixture consists of: a) a hydrated clay suspension, b) 40-60 wt. % sulfur derived from elemental sulfur, based on the total weight of the flowable mixture; c) 0-5 wt. wt. % anti-freeze, such as propylene glycol, based on the total weight of the flowable mixture; d) 0-5 wt. % anti-foam, such as polydimethylsiloxane, based on the total weight of the flowable mixture; e) 0-10 wt. %, or more preferably 0-5 wt. %, diatomaceous earth based on the total weight of the flowable mixture, such that the only solvent in the flowable mixture is water.

In one embodiment, the hydrated clay suspension, suspension of elemental sulfur particles, and optional additives are thoroughly mixed until a>1 cP (20° C.), and more preferably >10 cP (20° C.), viscosity is met. In one embodiment, the mixture of the hydrated clay suspension, the suspension of elemental sulfur particles, and the optional additives are mixed for 1-3 hours until a>1 cP (20° C.), and more preferably >10 cP (20° C.), viscosity is met. In an alternate embodiment, molten elemental sulfur is directly homogenized with a mixture of the hydrated clay suspension and optional additives. In one embodiment, the hydrated clay suspension and sulfur derived from elemental sulfur, preferably in the form of elemental sulfur particles, is provided in such quantities as to arrive at a flowable mixture including 40-60 wt. %, more preferably 50-55 wt. %, and even more preferably 51-53 wt. % sulfur derived from elemental sulfur, based on the total weight of the flowable mixture. Preferably no heat is added during the formation of the flowable mixture and the mixture is formed around room temperature, i.e. 20 and 26° C. (68 and 79° F.).

In a preferred embodiment, the flowable mixture includes 40-60 wt. % sulfur derived from elemental sulfur, based on the total weight of the flowable mixture, for use as a fertilizer or fungicide. The term "fertilizer" is used to designate any substance (natural or of synthetic origin) that is applied to soils or to plant tissues to supply one or more plant nutrients essential to the growth of plants. The term "fungicide" is used to designate any substance (natural or of synthetic origin) that is applied to soils or to plant tissues used to inhibit fungi or fungal spores.

Optionally, the flowable mixture can by combined with other plant nutrients including boron, nitrogen, phosphorus, potassium, iron, copper, zinc, manganese, magnesium or combinations of the foregoing. These components can be present in the flowable mixture in amounts of from about 0 wt. % to about 20 wt. % and more preferably, 0 wt. % to about 10 wt. %, based on the total weight of the flowable mixture. In an alternate embodiment, these plant nutrients may be combined with the hydrated clay suspension and/or suspension of elemental sulfur particles prior to the formation of the flowable mixture.

In a preferred embodiment, the flowable mixture consists of: a) a hydrated clay suspension, b) 40-60 wt. % sulfur derived from elemental sulfur, based on the total weight of the flowable mixture; c) 0-5 wt. wt. % anti-freeze, such as propylene glycol, based on the total weight of the flowable mixture; d) 0-5 wt. % anti-foam, such as polydimethylsiloxane, based on the total weight of the flowable mixture; e) 0-10 wt. %, or more preferably 0-5 wt. %, diatomaceous earth based on the total weight of the flowable mixture, f) 0 wt. % to about 20 wt. %, or more preferably 0 wt. % to about 10 wt. %, at least one plant nutrient based on the total weight of the flowable mixture, such that the only solvent in the flowable mixture is water.

EXAMPLES

General Procedure:

The bentonite clay utilized under this invention was purchased from Vanderbilt Minerals, LLC, Mineral Technologies, and other sources of refined bentonite clay and are not limited to these sources. The bentonite clay was then hydrated by mixing with water and stirred, with or without heat, until the viscosity of the clay was higher than water itself. An aqueous suspension of elemental sulfur particles with additional additives, as provided below in Table 1, were then added and stirred until a homogeneous suspension is formed providing a flowable mixture having a viscosity >1 cP and more preferably >10 cP (20° C.).

TABLE 1

Examples of stable flowable mixtures (amounts in wt. %)

| | A | B | C | D | E | F | G | H | I |
|---|---|---|---|---|---|---|---|---|---|
| Bentonite Clay | 2 | 2 | 2 | 2 | 5 | 1 | 2 | 2 | 2 |
| Water | 23.5 | 18 | 18.25 | 23 | 37.25 | 12.5 | 20.75 | 20.75 | 15.75 |
| Sulfur Suspension including 70% Elemental Sulfur | 74.25 | 74.75 | 74.25 | 74.25 | 57 | 85.75 | 71.5 | 71.5 | 71.5 |
| Propylene Glycol | 0 | 5 | 0.5 | 0.5 | 0.5 | 0.5 | 0.5 | 0.5 | 0.5 |
| polydimethylsiloxane | 0.25 | 0.25 | 5 | 0.25 | 0.25 | 0.25 | 0.25 | 0.25 | 0.25 |
| Diatomaceous Earth | 0 | 0 | 0 | 0 | 0 | 0 | 5 | 0 | 0 |
| Disodium Octaborate Tetrahydrate | 0 | 0 | 0 | 0 | 0 | 0 | 0 | 5 | 0 |
| Tribasic Copper Sulfate | 0 | 0 | 0 | 0 | 0 | 0 | 0 | 0 | 10 |

The flowable mixtures were then placed for stability testing. The EPA Guidelines on Stability that issued on Nov. 16, 2012 to the Office of Pesticide Programs (OPP) relating to "Accelerated Storage Stability and Corrosion Characteristics Study Protocol" were followed. As provided in the EPA Guidelines, accelerated storage stability can be used to fulfill EPA data requirements. OPP has determined that this study, conducted for 14 days at an elevated temperature (54° C.), provides adequate data in certain circumstances to allow EPA to make a regulatory finding regarding the stability of the product and the effect of the formulation on the product packaging. All of the examples containing the bentonite clay demonstrated a stable mixture under these conditions (Table 1), as well as those set up under high vibration conditions; whereas, those not containing the clay resulted in a hardened bottom layer of conglomerated sulfur. Particle size evaluation of these flowable mixtures showed all examples to be less than 1.5 microns.

Although the present invention has been disclosed in terms of a preferred embodiment, it will be understood that numerous additional modifications and variations could be made thereto without departing from the scope of the invention.

I claim:

1. A stable flowable mixture including:
   a) a hydrated clay suspension including between 0.5-7.5 wt. % absorbent clay based on the total weight of the flowable mixture;
   b) 40-60 wt. % sulfur derived from elemental sulfur, based on the total weight of the flowable mixture; and
   c) optional additives;
   wherein all the sulfur in said stable flowable mixture is elemental sulfur provided as a suspension of elemental sulfur particles having a particle size of less than 50 μm, and said stable flowable mixture does not include any surfactants, and wherein said flowable mixture includes at least 12.5 wt. % water.

2. The stable flowable mixture of claim 1, wherein said flowable mixture does not include any bio-based suspending agent.

3. The stable flowable mixture of claim 1, wherein said hydrated clay suspension consists of only at least one absorbent clay with at least one solvent.

4. The stable flowable mixture of claim 3, wherein said hydrated clay suspension consists of only bentonite as said absorbent clay and water as said solvent.

5. The stable flowable mixture of claim 4, wherein said bentonite is selected from the group consisting of calcium bentonite, sodium bentonite, and combinations thereof.

6. The stable flowable mixture of claim 1, wherein said stable flowable mixture has a viscosity higher than 1 cP (20° C.).

7. The stable flowable mixture of claim 1, wherein said suspension of elemental sulfur particles is concentrated to include 70-80% elemental sulfur, based on the total weight of the suspension of elemental sulfur particles, in an aqueous media.

8. The stable flowable mixture of claim 1, wherein all of said sulfur has a particle size of less than 1.5 um.

9. The stable flowable mixture of claim 1, wherein said additives are selected from the group including 0-5 wt. % anti-freeze, 0-5 wt. % anti-foam, 0-10 wt. % diatomaceous earth, 0-20 wt. % plant nutrients and combinations thereof, based on the total weight of the flowable mixture.

10. The stable flowable mixture of claim 1, further including propylene glycol as an anti-freeze and polydimethylsiloxane as an anti-foam.

11. The stable flowable mixture of claim 1, wherein said elemental sulfur is provided as molten elemental sulfur.

12. The stable flowable mixture of claim 1, including 50-55 wt. % sulfur derived from elemental sulfur, based on the total weight of the flowable mixture.

13. The stable flowable mixture of claim 1, including 51-53 wt. % sulfur derived from elemental sulfur, based on the total weight of the flowable mixture.

14. The stable flowable mixture of claim 1, wherein the only solvent in the flowable mixture is water.

15. A fertilizer or fungicide composition including:
   the stable flowable mixture of claim 1, wherein said flowable mixture has fertilizing and/or fungicidal activity.

16. The fertilizer or fungicide composition of claim 15, wherein said additives are plant nutrients selected from the group consisting of boron, nitrogen, phosphorus, potassium, iron, copper, zinc, manganese, magnesium and combinations thereof.

17. The stable flowable mixture of claim 1, further comprising 12.5-37.25 wt. % water.

18. The stable flowable mixture of claim 1, wherein said flowable mixture has a viscosity >1 cP.

19. A stable flowable mixture consisting of:
  a) a hydrated clay suspension including 0.5-7.5 wt. % absorbent clay based on the total weight of the flowable mixture, wherein the absorbent is bentonite;
  b) 40-60 wt. % sulfur derived from elemental sulfur, based on the total weight of the flowable mixture;
  c) additives selected from the group consisting of antifreeze, anti-foam, diatomaceous earth, plant nutrients and combinations thereof, and
  d) at least 12.5 wt. % water,
  wherein said elemental sulfur is provided as a suspension of elemental sulfur particles having a particle size of less than 50 μm;
  wherein said flowable mixture does not include any preservatives or surfactants;
  wherein the only solvent in the flowable mixture is water and
  wherein said flowable mixture does not include any bio-based suspending agent.

20. The stable flowable mixture of claim 1, wherein said stable flowable mixture is stable after 14 days at an elevated temperature of 54° C.

\* \* \* \* \*